United States Patent [19]

Green

[11] Patent Number: 4,720,960

[45] Date of Patent: Jan. 26, 1988

[54] SHEET COLLATING APPARATUS AND METHOD

[76] Inventor: Ronald J. Green, 12788 - 91st Ave., N., Seminole, Fla. 33542

[21] Appl. No.: 825,815

[22] Filed: Feb. 4, 1986

[51] Int. Cl.⁴ .............................................. G01G 23/28

[52] U.S. Cl. ........................................ 53/447; 53/154; 53/266 A; 270/58; 271/9

[58] Field of Search ...................... 53/447, 266 A, 540, 53/154; 271/9; 270/57, 58

[56] References Cited

U.S. PATENT DOCUMENTS

| | | | |
|---|---|---|---|
| 4,079,576 | 3/1978 | Morrison et al. | 53/266 A |
| 4,253,651 | 3/1981 | McInerny | 270/58 |
| 4,280,690 | 7/1981 | Hill | 270/58 |
| 4,388,994 | 6/1983 | Suda et al. | 270/58 X |
| 4,527,790 | 7/1985 | Piotroski | 270/58 |
| 4,545,178 | 10/1985 | Parthasarathi | 53/266 A X |
| 4,571,925 | 2/1986 | Adams | 53/266 A X |

OTHER PUBLICATIONS

Bell & Howell Parts Catalog, Copyright 1975, 10,000 Model and Imperial Model, "Envelope Insertion Machine".

*Primary Examiner*—James F. Coan
*Attorney, Agent, or Firm*—Dominik, Stein, Saccocio & Reese

[57] ABSTRACT

A method is disclosed for collating sheets into sets from stacks of sheets wherein the number of sheets in each collated set may be greater than the number of stacks which can be supported within the apparatus for collating the sheets. Also disclosed is a system for carrying out the above-described method including a collating machine, an envelope handling assembly, and a set handling assembly. Also disclosed is the set handling assembly for feeding and storing sets of collated sheets for use with the collating machine.

29 Claims, 5 Drawing Figures

SHEET COLLATING APPARATUS AND METHOD

BACKGROUND OF THE INVENTION

1. Field of the Invention

This invention relates to a method of collating sheets and to apparatus which may be used for carrying out such method. More particularly, this invention relates to a method of collating sheets into sets from stacks of sheets wherein the number of sheets in each collated set may be greater than the number of stacks which can be supported on trays within the apparatus for carrying out the method. This invention also relates to the apparatus for carrying out the above-described method and a particular set handling assembly which is part of such apparatus.

2. Description of the Background Art

Presently, there exist many methods and systems designed to collate stacked, sorted sheets. By advancing single sheets sequentially from stacks of sorted sheets to a sheet transport device in an appropriate timed sequence with respect to an adjacent sheet feeding station, the sheets may be collated into sets. Thereafter, the collated sets of sheets may be fed to an area whereat the collated sets may be sequentially stuffed into envelopes. Unfortunately, however, in all of the prior art systems and methods for effecting such collation, the number of sheets in any collated set is limited by the number of stacks of sorted sheets contained within the collating system.

One such prior device for carrying out the collating and stuffing method as described above is disclosed in PARTS CATALOG, 10,000 MODEL, IMPERIAL MODEL, TP 50000, by Business Equipment Group, Bell & Howell, 6800 McCormick Rd., Chicago, Ill. 60645.

An additional related prior disclosure is U.S. Pat. No. 4,253,651 to McInerny et al. According to the McInerny et al disclosure, a device is provided for handling documents which operates to interleaf or intermix documents from separate stacks in accordance with a predetermined pattern. The documents from separate stacks are fed one-by-one through separate feed paths with means for insuring single-document feed and means for counting prior to merging and discharging of the merged documents. The device includes a complicated and expensive logic and counter, feed controls, display and program selector. The device does not allow for the collating of sheets into set wherein the number of sheets in a collated set may exceed the number of supporting trays for the sheet material to be collated.

An additional related prior disclosure is U.S. Pat. No. 4,527,791 to Piotroski. The Piotroski disclosure relates to a document inserter system having improved controls. The system includes a sheet inserter mechanism and one or more web modules for receiving a web of forms, scanning the forms for information, storing and retransmitting the information, separating the web into discrete forms and feeding the forms for further processing. The system is controlled in accordance with a prespecified configuration which defines the document type for each web module. An operator input is provided to specify a configuration for a mailing. The configuration may be specified by interactive selection from a menu displayed by the supervisory control processor. The control system is a complex and expensive computer. The device does not allow for the collating of sheets into sets wherein the number of sheets in a collated set may exceed the number of supporting trays for the sheet material to be collated.

An additional related prior disclosure is U.S. Pat. No. 4,280,690 to Hill. According to the Hill disclosure, a plurality of trays equal in number to the number of sheets to be provided into a collated set is supported with a apparatus for producing the superposed collated assembly of sheets on a conveyor. The individual sheets are transported from their supporting trays along angled paths intersecting the conveyor and result in the deposit of the sheets on top of each other and on the conveyor in the desired and intended collated condition. The device does not allow for the collating of sheets into sets wherein the number of sheets in a collated set may exceed the number of supporting trays for the sheet material to be collated.

As illustrated by the great number of prior disclosures, including those noted above, efforts are continuously being made in an attempt to economically, reliably and conveniently collate sheets into sets. Nothing in the prior art, however, discloses or suggests the present inventive combination of method steps and component elements for economically, reliably and conveniently collating sorted sheets wherein the number of sheets in each collated set may be greater than the number of stacks of sheets which can be supported on trays within the system for carrying out the method.

It is, therefore, an object of the present invention to collate sheet material into sets wherein the number of sheets in each set is not limited by the number of stack-supporting trays within the collating apparatus.

Another object of the invention is to provide an apparatus which easily is mounted to a conventional multi-sheet envelope stuffing machine to convert the envelope stuffing machine to a collator.

The present invention achieves its purposes, objectives and advantages over the prior art through a new, useful and unobvious combination of method steps and component elements for collating sheet material, with a minimum number of method steps and functioning parts, at a reduction of cost, and through the utilization of only readily available materials and conventional components.

The foregoing has outlined some of the more pertinent objects of the invention. These objects should be construed as being merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a method of collating sheets into sets from stacks of sheets wherein the number of sheets in each collated set may be greater than the number of stacks which can be supported within the collating machine. The method comprises the steps of supporting a predetermined number of stacks of sorted sheets in a collating machine which has a predetermined number of trays for supporting the stacks. Sheets are sequentially advanced from the trays to mechanisms for sheet transport while the advanced sheets are transported to thereby collate the sheets into preliminary sets. The preliminary collated sets are then sequentially transported to a terminal point. The plurality of preliminary collated sets are then received and stored in a hopper for set storage adjacent the terminal point. The preliminary collated sets are then moved from the hopper for set storage to one of the trays. The preliminary collated sets are then supported in its tray. A predetermined number of additional stacks of sorted sheets are also supported in others of the trays. Preliminary collated sets are then advanced each from its tray to the mechanisms for sheet transport and additional sheets are also sequentially advanced from the others of the trays to the mechanisms for sheet transport while transporting the advanced preliminary collated sets and additional sheets whereby preliminary collated sets and additional sheets are collated into final collated sets. The final collated sets are transported sequentially to the terminal point.

The method further includes the step of sequentially transporting envelopes first from a supply of empty envelopes, and then past the terminal point whereat each envelope is sequentially stuffed with a final collated set of sheets, and then to a hopper for receiving the stuffed envelopes. Only a single sheet is advanced from each tray to the mechanisms for sheet transport when the trays are supporting only sorted sheets. A predetermined plurality of sheets constituting a preliminary collated set is advanced from a tray to the mechanisms for sheet transport when a tray is supporting preliminary sets of collated sheets. The method further includes the step of sensing the plurality of sheets constituting a preliminary collated set of sheets in the tray to preclude the advancing of more than a single set of preliminary collated sheets at one time. The method further includes the steps of removing at least a portion of the mechanisms for set handling when the trays contain only sorted sheets. The method further includes the steps of adding at least a portion of the mechanisms for envelope handling and removing the mechanisms for set handling when a tray contains sets of preliminary collated sheets.

The invention also comprises a system for collating sheets into sets from stacks of sheets wherein the number of sheets in each collated set may be greater than the number of stacks which can be supported. The system comprises a machine for supporting a predetermined number of stacks of sheets and for collating the sheets into sets. The machine includes a sheet supporting station having a predetermined number of trays for supporting stacks equal in number to the predetermined number. The machine also includes a sheet feeding station having sheet transport means located to sequentially receive and transport sheets sequentially advanced from the trays to thereby collate the sheets into sets and then to sequentially transport sets of collated sheets to the terminal end of the sheet transport means. The system also includes an envelope handling assembly with envelope transport means adapted to sequentially transport the envelopes first from a supply of empty envelopes, and then to the terminal end of the sheet transport means whereat each envelope is stuffed with a set of collated sheets, and then to a hopper for receiving the stuffed envelopes. The system yet further includes a set of handling assembly with intermediate set storage means adapted to sequentially receive and store a plurality of collated sets, the set handling assembly also including set feeding means adapted to sequentially receive sets of collated sheets from the terminal end of the sheet transport means and to feed the received sets of collated sheets to the set storage means. Lastly, the system includes positioning means on the machine adapted to removably position the set handling assembly with respect to the terminal end of the sheet transport means to the preclusion of the envelope handling assembly.

The machine of the system further includes means to advance a single sheet from each tray to the sheet transport means when the set handling assembly is operatively positioned with respect to the terminal end of the sheet transport means. The machine further includes additional means to sense, separate and advance a predetermined number of sheets constituting a collated set from at least one tray to the sheet transport means when the envelope handling assembly is operatively positioned with respect to the terminal end of the sheet transport means. The additional means includes means associated with the sheets of the tray supporting collated sets of sheets to contact, effectively sense and separate the predetermined number of sheets of a collated set to be advanced, and the machine further includes means to grasp and advance the predetermined number of sheets together as a collated set from the tray supporting the collated sets of sheets to the sheet transport means. The means to contact, effectively sense and separate is a suction tube adapted to contact the bottommost sheet in the stack of collated sets to be grasped and advanced from the tray supporting the collated sets of sheets, and the system further includes means to move the suction tube downwardly to separate the bottommost collated set from the remainder of the collated sets in the tray and the system further includes means to eliminate the suction of the suction tube when the means to grasp and advance has grasped the separated bottommost collated set. The means to sense and separate includes aligned apertures in all of the sheets of each collated set to be advanced except for the topmost sheet of each collated set whereby the suction from the suction tube will sequentially sense and separate one complete collated set of sheets including the apertured sheets and the nonapertured sheet immediately thereabove. The system further includes means associated with the envelope handling assembly for releasably, operatively positioning at least a portion thereof with respect to the terminal end of the sheet transport means when the set handling assembly is not operatively positioned with respect to the terminal end of the sheet transport means The invention also includes apparatus for sequentially feeding and storing sets of sheets comprising, in combination, a sheet storage hopper adapted to receive and store a plurality of sets of sheets and a sheet feeding means having an input end adapted to sequentially receive sets of sheets to be fed and stored, and an output end adapted to sequentially dispense sets of fed sheets to the sheet storage hopper, and sheet feeding mechanisms to sequentially transport sets of sheets along a sheet feed path from the input end to the output end and into the storage hopper. The sheet feeding mechanisms include an upper elastomeric band and a plurality of lower elastomeric bands, each band being supported in a closed-loop configuration, with the upper band above, and the lower bands below, the sheet feed path, and with the lower extent of the upper band and the upper extents of the lower bands defining the sheet feed path therebetween. The upper band and the central lower bands are in mutual vertical alignment to contact one another when no sheets are present therebetween but to contact and transport sets of sheets which may be introduced to the sheet feed path at the input end. The bands are supported adjacent the input end and the output end by rollers, and the apparatus further includes motor means adjacent the output end to drive the rollers supporting the lower bands. The rollers and bands below the sheet feed path are fixedly positioned to define an incline extending upwardly toward the output end while the rollers and band above the sheet feed path are pivotable adjacent the output end to rest in sheet driving relationship with respect to the bands below the sheet feed path. The apparatus further includes an inverted U-shaped support with roller-supporting shafts mounted, one above the other, at their ends in the vertical extents of the support. The apparatus further includes arms extending from shafts adjacent the output end for supporting additional shafts, with the additional shafts supporting the rollers and bands adjacent the input end. The apparatus further includes counter means operatively associated with the sheet feed mechanisms to count the number of sets of sheets forwarded by the sheet feeding means.

The invention yet further includes a machine for collating sheets into sets from stacks of sheets. The machine comprises apparatus for supporting stacks of sheets and for collating the stacked sheets into sets. The apparatus includes a sheet supporting station having trays for supporting stacks of sheets to be collated. The apparatus also includes a sheet feeding station having sheet transport means located to sequentially receive and transport sheets advanced from the trays to thereby collate the advanced sheets into sets and then to sequentially transport sets of collated sheets to the terminal end of the sheet transport means. The machine also comprises set handling means including set storage means adapted to sequentially receive and store a plurality of collated sets. The set handling means also includes set feeding means adapted to sequentially receive sets of collated sheets from adjacent the terminal end of the sheet transport means and to feed the received sets of collated sheets to the set storage means. The machine also comprises transition means positioned between the terminal end of the sheet transport means and the set handling means to support and guide sets of collated sheets from adjacent the terminal end of the sheet transport means into the set feeding means. The transition means is a plate with an arcuate profile. The machine further includes means to resiliently urge the plate upwardly into contact with the terminal end of the sheet transport means. The transition means includes an input end releasably attached to the sheet transport means adjacent the terminal end. The transition means includes an output end supported by the set handling means. The transition means is adjustably attached to the sheet transport means adjacent the terminal end to accommodate the set handling means being positioned at different distances from the terminal end. The transition means includes a plurality of trays of varying lengths, any one of which may be attached to the sheet transport means adjacent the terminal end to accommodate the set handling means being positioned at different distances from the terminal end.

The foregoing has outlined rather broadly the more pertinent and important features of the present invention in order that the detailed description of the invention that follows may be better understood whereby the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which.

DETAILED DESCRIPTION OF THE PREFERRED EMBODIMENT

Figure 1:
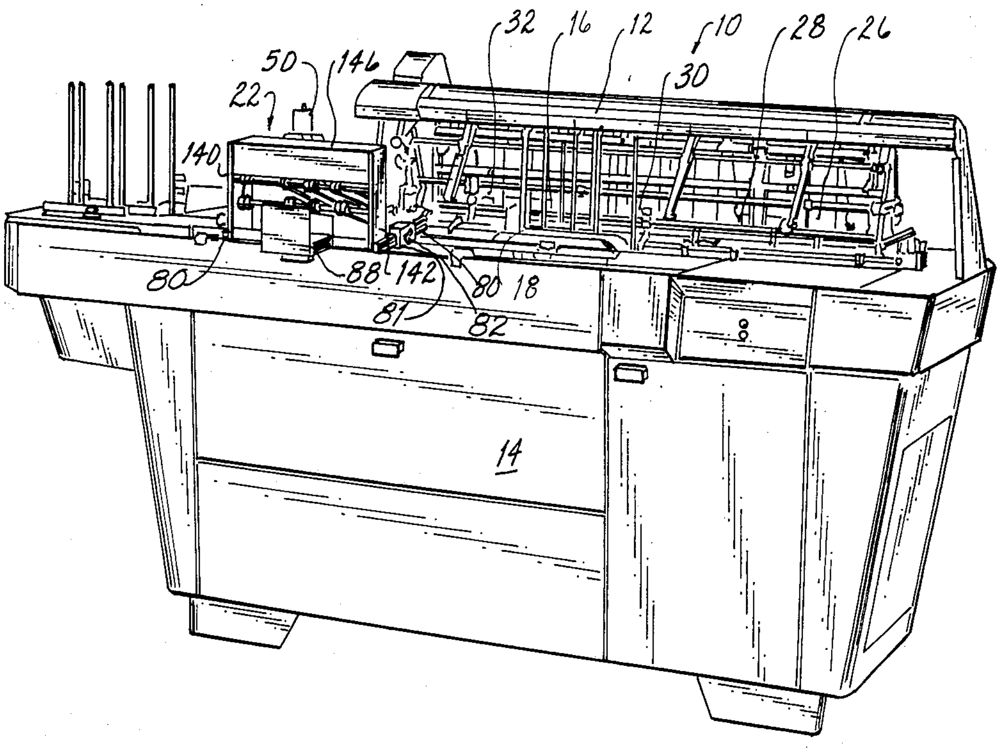
FIG. 1 is an isometric view of a collating system adapted to carry out the method of the present invention but with the set handling assembly attached rather than the entire envelope handling assembly.
Figure 2:
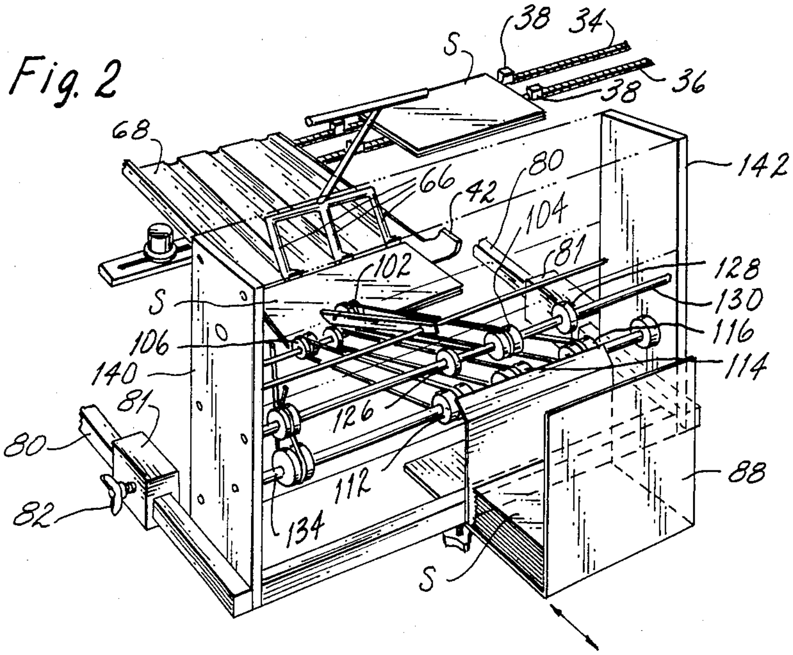
FIG. 2 is an enlarged isometric view of the set handling assembly of FIG. 1 including various other adjacent components of then collating machine.
Figure 3:
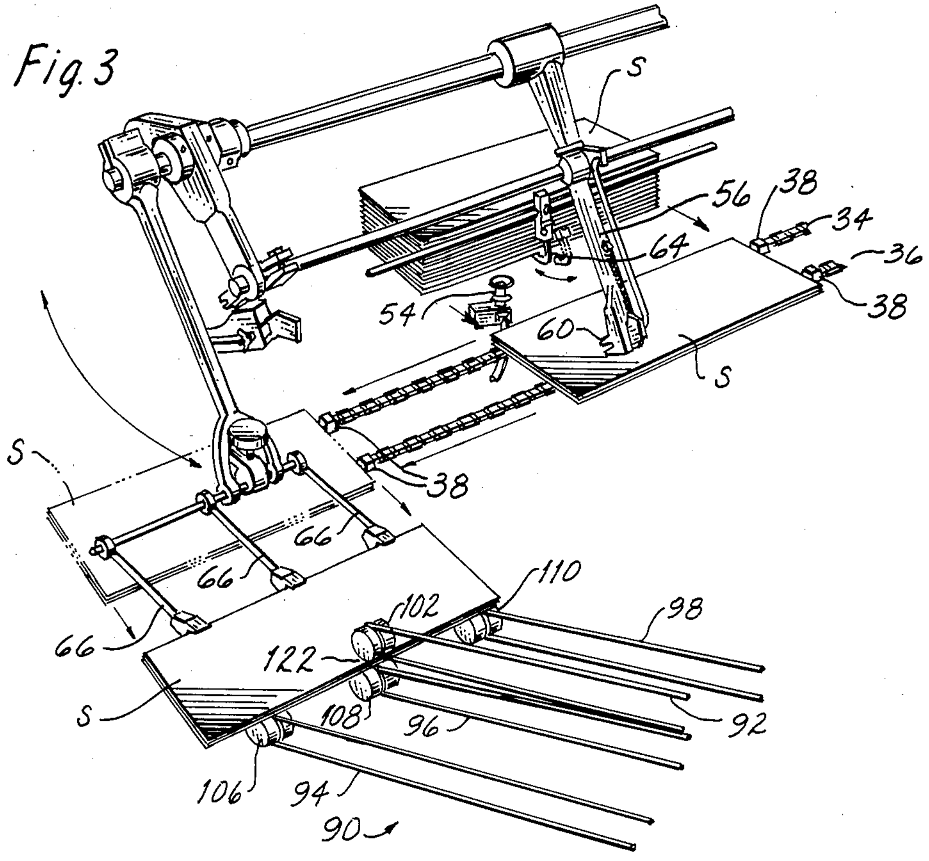
FIG. 3 is an enlarged isometric view of the set handling assembly shown in FIG. 2 but viewed from a slightly different angle and including additional parts of the collating machine.
Figure 5:
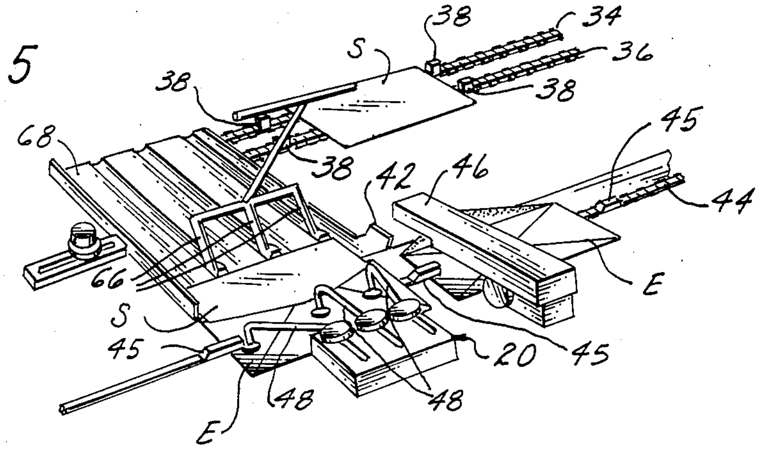
FIG. 5 is an enlarged isometric view similar to FIGS. 2 and 3 but with the set handling assembly removed and with the envelope handling assembly operatively attached to the collating machine.
Figure 4:
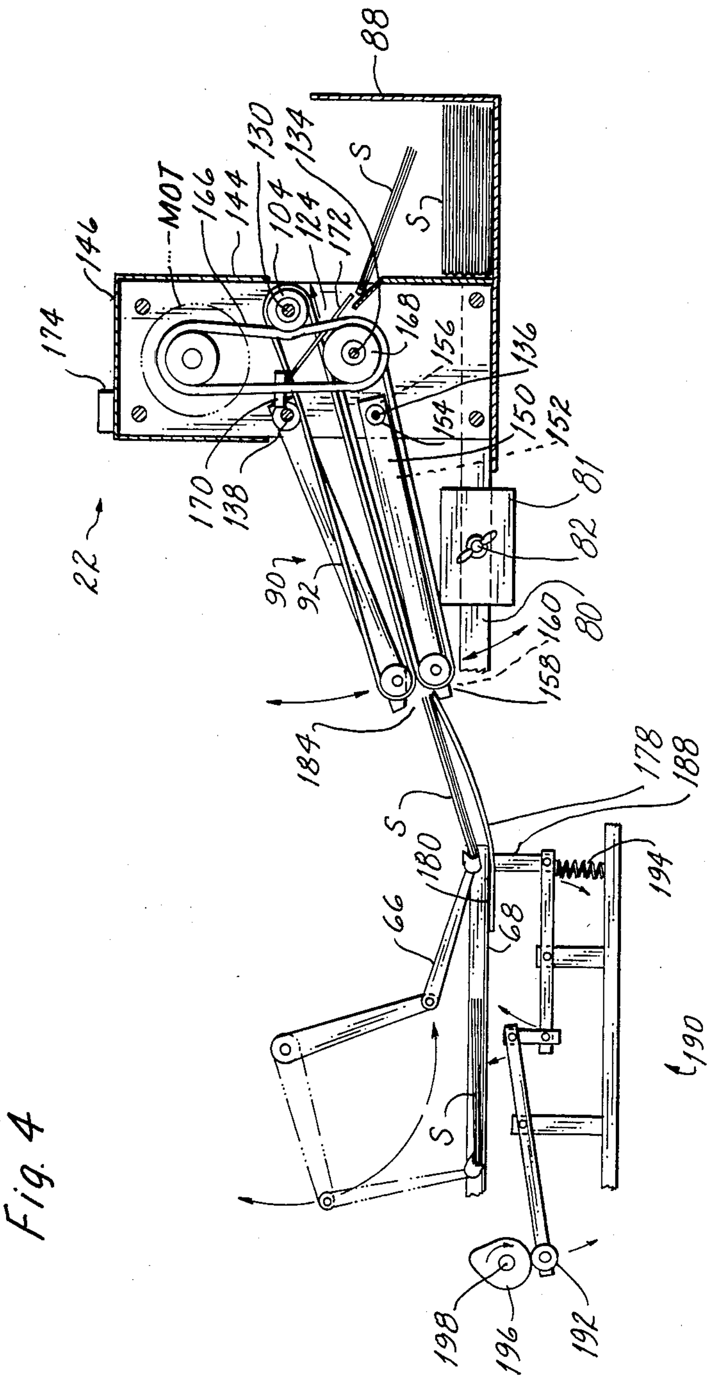
FIG. 4 is a sectional view showing the set handling assembly and adjacent parts of the collating machine.

FIG. 1 is an isometric view of the collating system 10 including machine 12 similar to that described in the above referenced PARTS CATALOG. Minor modifications have been made to the aforementioned collating machine as will be described hereinafter. The subject matter of the above referenced PARTS CATALOG and the machine which it describes are incorporated herein by reference.

The collating machine 12 is a floor-mounted unit with a base 14 containing the various operational and control mechanisms. For the purposes of the present disclosure, the collating machine may be considered as including a sheet supporting station 16 and a sheet feeding station 18. The collating machine 12 also includes an envelope handling assembly 20 and set handling assembly 22.

The sheet supporting station 16 includes a plurality of trays of a predetermined number, each of which is adapted to support a stack of sorted sheets S, each containing the same subject matter and each facing in the same direction. The predetermined number of trays limits the number of stacks of sorted sheets S and, as can be understood, constitutes the number of sheets which is normally the upper limit for any set collated by the collating machine 12. The particular collating machine 12, as illustrated, includes four sheet supporting trays 26, 28, 30 and 32. The number of trays disclosed herein is for illustrative purposes only since any number, greater or lesser, could be utilized.

The sheet feeding station 18 includes transport means with a pair of chains 34 and 36 in a closed-loop configuration and entrained around parallel drive sprockets with upstanding projections 38 for conveying advanced sheets from adjacent the sheet support station 16 toward the terminal end 42 of the sheet feeding station 18. At least one end of the chains 34 and 36 is positively driven by a motor, not shown, to effect continuous intermittent motion of the chains 34 and 36 in correlation with the advancement of the sheets from their trays 26, 28, 30 and 32.

The movement of the collated sets of sheets S is concurrent with the movement of envelopes E. The movement of the envelopes is effected by an envelope handling assembly 20. The envelope handling assembly 20 includes a chain 44 in a closed-loop configuration driven at one end by a sprocket and motor, not shown, in timed relationship with the sheet feeding mechanisms or chains 34 and 36. The envelope handling assembly is adapted to sequentially feed envelopes from a supply of empty envelopes past the terminal end 42 of the sheet feeding station 18, and into a hopper for storage of the final stuffed envelopes.

The empty envelopes E are fed from the bottom of their supporting tray where they are advanced into engagement with a conveyor chain 44 as it moves around one end sprocket. A plurality of gripper jaws 45 are secured at spaced locations along the length of the chain so as to hold the leading edge of an envelope being transported. When the chain 44 is rotated around each of its supporting end sprocket, the trailing edges of the jaws separate from the chain to allow the receipt of an empty envelope to be stuffed at the supporting tray, to convey envelopes in a step and repeat motion in a straight line path past the terminal end for stuffing, and to allow the release of a stuffed and sealed envelope at the storage hopper as the chain moves around an end sprocket.

Prior to each envelope E arriving at the terminal end, a device 46 folds back the flap of the envelope while envelope suction tubes 48 provide for intermittent suction and vertical movement to open the envelope for the receipt or stuffing of the collated sets of sheets S into the envelopes. Thereafter, a device 50 is positioned for providing water as through an attached brush to the appropriate adhesive-coated point or points on the tab or flap of the envelope so that the envelope might be sealed prior to its final motion into the hopper.

Operatively located between the sheet supporting station 16 and sheet feeding station 18 are mechanisms, one for each tray, adapted to sequentially contact, sense, separate, grasp and feed the single lowermost sheet in each stack from the remainder of sheets in the stack.

Single sheets S are sequentially fed in a timed sequence from the trays 26, 28, 30 and 32 to the chains 34 and 36 for advancing the sheets toward the terminal end 42 of the sheet feed path. The feeding of a sheet is initiated by first separating the leading edge of the bottommost sheet in the stack from the sheets thereabove. This is effected by a suction tube 54 which contacts, effectively senses and then pneumatically grasps the center of the leading edge of the bottommost sheet to be fed.

The suction tube 54 is attached to an oscillating horizontal rod, beneath the trays and parallel with the chains 34 and 36, for arcuate reciprocation or oscillation between an upper position where it contacts and grasps *the sheet, to a lower position away from the rest of the* sheets, for facilitating sheet grasping by the feeding fingers or grippers 60 to the preclusion of the other sheets in the stack. Upon being grasped by the fingers 60 for advancement to the feeding chains 34 and 36, the suction is relieved. The fingers oscillate on arms 56 secured to a horizontal shaft, above the trays and parallel with the chains 34 and 36, to advance the grasped sheets. The suction tubes then oscillate back for separating the next bottommost sheet in the stack to be fed. Assistance to the suction tube and gripper fingers at each tray is provided by a separating finger 64 which reciprocates on an oscillating horizontal bar to move from a lower or active position to a higher or inactive position. In the active position, the finger is located between the stack of sheets and the bottommost sheet which has been separated from the rest of the stack by the suction tube to assist the associated suction tube in its separation function. In the inactive position, the finger is located out of the way above the gripper fingers to thereby allow the gripper fingers to advance the bottommost sheet to the chains for being fed toward the terminal end of the apparatus. The oscillation of the various bars and the suction of the suction tubes are effected in timed sequence by the overall programmer of the machine. The suction tube for any tray may also be located to one edge of the stack of sheets. In such case, the separating finger 64 is positioned to be in operative proximity thereto. In such an arrangement, the separating finger 64 could be secured to a vertical rod for reciprocally swinging or oscillating the separating finger 64 within a horizontal plane. The timing and function would remain the same as if it were mounted on a horizontal axis of rotation as described above.

At the opposite end of the sheet feeding chains 34 and 36 are pusher fingers 66 to move the conveyed sets of sheets along a tray 68 to the terminal end 42 of the sheet feed station 18. The throw of the fingers 66 is adjustable so that the sets of sheets will just be received at the sheet feed path of the set handling assembly 22 as will be described hereinafter.

When the movement of the sheet transport means is correlated with the movement of the sheet suction tubes 54, pusher bars 58 and pulling grippers 60, sheets from each tray 26, 28, 30 and 32 will be sequentially advanced to the same point on the sheet transport chains 34 and 36, part of the sheet feeding station. Continued movement of the collated sets beyond the chains 34 and 36 is effected by pusher rods 66, to move the collated sets of sheets from the chains 34 and 36, down the tray 68 toward the terminal end of the sheet feeding station.

During operation, it is necessary to operatively disassociate at least a portion of the envelope handling assembly 20, preferably the suction tubes 48, from the collating machine 12 and system 10. In place thereof, a set handling assembly 22 is operatively associated and positioned in the system in the place of the envelope handling assembly portions which have been removed. The set handling assembly includes extension bars 80 and friction bolts 82 in collars 81 affixed to the collating machine. The extension bars 80 are slidable within collars 81 to allow adjustment of the set handling assembly 22 to be adjusted relative to the terminal end of the sheet feed path.

The set handling assembly 22 includes a preliminary set storage hopper 88 for the receipt of preliminary sets of sheets collated by the collating machine 12. Inasmuch as the envelope-opening suction tubes 48 of the envelope handling assembly 20 have been removed from the terminal end 42 of the sheet transport means and replaced by the set handling assembly 22, the conveyed collated sets of sheets may be received by the set transport means 90 of the set handling assembly 22 and deposited into the preliminary set storage hopper 88. The set transport means 90 is formed of mechanisms including a single central upper elastomeric band 92 and lower elastomeric bands 94, 96 and 98, each supported in a closed-loop configuration. The bands 92, 94, 96 and 98 are supported on rollers 102, 104, 106, 108, 110, 112, 114 and 116 to define an upper band 92 and rollers 102 and 104 and lower bands 94, 96 and 98 and rollers 106, 108, 110, 112, 114 and 116 with a path therebetween defining the feed path 120 for the sets of sheets. The sheet feed path is essentially linear from the input end 122 to the output end 124 of the sheet transport means. The upper band and roller is above the sheet feed path 120 and the lower bands 94, 96 and 98 and rollers 106, 108, 110, 112, 114 and 116 are beneath the sheet feed path 120. Outside bearings 126 and 128, freely rotatable on an upper shaft 130, break the movement of the edges of the sheets immediately before being deposited into the hopper 88.

It is preferred that both the upper and lower rollers 102 and 104 and 106 through 116, respectively, and bands 92, 94, 96, and 98, respectively, include central rollers 102, 104, 108 and 114 and bands 92 and 96 with at least two additional laterally spaced bands 94 and 98 and rollers 106, 110, 112 and 116 beneath the sheet feed path to preclude canting of the sets during movement along the set feed path. The rollers 106 through 116 beneath the sheet feed path 120 adjacent the output end are fixedly supported on the rotatable driven shaft 134 with its ends rotatably supported. The central roller 114 beneath the sheet feed path is driven due to its attachment to its driven shaft 134. The remainder of the rollers 112 and 116 are also rotatable with shaft 134 to preclude canting of fed sets of sheets. Proper feeding is enhanced by holding all of the bands 92, 94, 96 and 98 in high tension and by using high friction material for the bands 92, 94, 96 and 98. The shafts 130, 134, 136 and 138 adjacent the output end 124 are secured to upstanding brackets 140 and 142 on a cover 144, U-shaped in configuration, with an upper horizontal brace 146. Extending arms 150 and 152 have first or inboard ends 154 and 156 fixedly secured to a rotatable shaft 136 mounted at its ends in the vertical brackets 140 and 142 of the U-shaped cover 144. The second or outboard ends 158 and 160 of the arms fixedly support a short shaft, with rollers 106, 108 and 110 thereon freely rotatable for receiving the lower bands at the input end.

The lower rollers and bands are fixedly secured with respect to the cover 144 during operation and use at about twenty degrees. This angle is adjustable through a set screw in shaft 136. The upper shaft 138 at the input end is supported freely by arm 162, freely pivotable about shaft 136 at the input end so that it may fall under its own weight with its band 92 in contact with the lower central band 96 when no sheets are being fed.

The upper horizontal brace 146 houses a motor MOT and an elastomeric drive band 166 in contact with a drive roller 168 secured to the lower rotatable shaft 134 to drive the lower rollers and bands adjacent the output end. The upper band 92 is driven by frictional contact with the lower central band 96 immediately therebelow. Also located within the upper horizontal cover is a counter 170. The counter 170 includes an arm 172 in the path of motion of the sets to register on a display device 174 the number of sets moved into the preliminary set storage means. Power may be provided to the counter by a battery or other source of potential.

Support and guidance of transported sheets S of the sets from the terminal end 42 of the sheet feed path to the input end 122 of the set feed path is provided by the transition plate 178. The transition plate 178 is positioned between the terminal end 42 of the sheet transport tray 68 and the set handling assembly 22 to support and guide sets of collated sheets S along their path of travel. The plate 178 is generally flat but is provided with a slight arcuate profile extending upwardly from the end 42 of the tray 68 to the leading edges 158 and 160 of the arms 150 and 152 of the set feeding assembly 22. The input end 180 of the plate 178 is releasably attached to the machine adjacent the terminal end of the tray. The output end 184 of the plate 178 is simply supported by the input leading edges 158 and 160 of the arms 150 and 152 of the set handling assembly 22. The plate 178 is adjustably attached to the machine in order to accommodate the set handling assembly 22 being positioned at different distances from the terminal end 42 of the tray 68 as might be required by slightly different sizes of sheets and sets being fed and collated. A plurality of plates 178 of varying lengths are preferably employed so that any one of them may be attached to the machine adjacent the terminal end 42 of the sheet transport means to further accommodate the set handling assembly 22 being positioned at different distances from the tray, again for handling greatly different sizes of sheets and sets being fed and collated.

When the machine is used in the envelope stuffing mode, a bar 188 reciprocates into contact with the flap of the stationary envelope being stuffed to urge the flap into contact with the back side to the tray 68 to thereby insure proper orientation of the envelope with respect to the stuffing mechanisms. The bar 188 is reciprocated downwardly away from the envelope and tray at all other times. The bar is coupled with three bars and two pins of a linkage 190, with the end of the linkage 190 remote from the bar 188 constituting a cam follower 192. The cam follower 192 is urged by a spring 194 to retain the bar in its upper orientation. A rotatable cam 196 urges the follower 192 and, therefore, the bar out of engagement with the envelope flap and tray when the envelope is moving with respect to the tray. When the machine is used in a mode with the envelope handling mechanisms removed, the cam is loosened through a set screw and axially shifted on its supporting shaft 198 so as to neither contact the follower, nor oscillate the linkage arrangement, nor, consequently, move the bar 188. The bar 188 can thus provide a constant force urging the plate against the tray. This arrangement helps ensure the proper orientation of the plate with respect to the tray and the set handling assembly. This arrangement also ensures that the plate is out of the way of the envelope handling chain and jaw which continue to move therebeneath even during the use of the set handling assembly. In addition, a set screw, axially positioned in the end of shaft 136 can be loosened, the arms 150 and 152 raised, and the set screw retightened to reposition the arms 150 and 152. This can provide for greater clearance for the chain 44 and bar 45 moving beneath the plate.

For the purposes of this application, the sheet handling apparatus and the sheet handling path are intended to extend from the bottom of the stacks of sheets at the sheet supporting station 16, to and along the chains 38, and along the tray 68. The set handling apparatus and set handling path are intended to extend from the transition plate 178, through the set transport means 90 and to the set storage means 88.

The method of the invention comprises the steps of supporting a predetermined number of stacks of sorted sheets in a collating machine 10 which has a predetermined number of trays 26, 28, 30 and 32 for supporting the stacks. The sheets S as shown herein are standard size data processing cards which may be stuffed into envelopes without a folding step. Any other type of sheets, cards or sheet material could be collated in accordance with the present invention. The writing or other indicia is preferably facing downwardly so that the first sheet faces the front face of an envelope after stuffing. This is desirable where envelopes with windows are being stuffed so that an address may show through the window.

The bottommost sheets are sequentially advanced from the trays to mechanisms for sheet transport, such as chains 34 and 36, while the advanced sheets are being transported. This action will collate the sheets into preliminary sets. A Page 1 from the first tray 26 would be advanced to a first segment of the chains. During its motion, Pages 2, 3 and 4 from the second, third and fourth trays 28, 30 and 32 would be advanced front face down, one above the other on the chains, to form a first collated set of sheets with the subsequently collated sets being formed sequentially on the following segments of the chains. The preliminary collated sets are then sequentially transported toward a terminal end 42. Pusher fingers 66 drive the sets sequentially from the chains 34 and 36, down the tray 68, and into the set handling assembly 22. The plurality of preliminary collated sets are then received and stored in a hopper 88 for set storage.

The resulting sets may be considered the final output of the machine. In the alternative, the preliminary collated sets may then be moved, as by hand, to the sheet supporting station 16 where they are supported in its tray, the first tray 26 of the sheet support station. A predetermined number of additional stacks of sorted sheets are also supported in others of the trays 28, 30 and 32. Preliminary collated sets are then advanced from its tray 26, side 1 still facing downwardly, to the chains and, thereafter, additional sheets are also sequentially advanced from the others of the trays to the chains while transporting the advanced preliminary collated sets. Preliminary collated sets are thus collated into final collated sets. Pages 5, 6 and 7, being sequentially added to Pages 1 through 4 of the preliminary collated set, will create a final collated set having a number of sheets greater than the number of trays in the collating machine. The final collated sets are then transported sequentially to the terminal end in a manner similar to that described with respect to the preliminary collated sets. The final collated sets are then stuffed into envelopes.

In carrying out the method, envelopes are transported first from a supply of empty envelopes, and then past the terminal point whereat each envelope is sequentially stuffed with a final collated set of sheets. The stuffed envelopes are then transported to a hopper.

In forming the preliminary collated sets, only a single sheet is advanced from each tray to the chains when the trays are supporting only sorted sheets. In forming the finally collated sets of sheets, a predetermined plurality of sheets constituting a preliminary collated set is advanced from the first tray to the chains when the first tray is supporting preliminary sets of collated sheets.

When feeding preliminary sets of sheets, the method further includes the step of sensing the plurality of sheets constituting a preliminary collated set of sheets in the tray to preclude the advancing of more than a single set of preliminary collated sheets at one time.

In an alternate mode of operation, plural preliminary sets may be formed and then positioned on various trays of the machine with or without additional sorted sheets in the remaining trays. This mode of operation further extends the utility of the system.

Various techniques may be utilized for the advancing of more than single sheets from trays, specifically, for the advancing of preliminary collated sets. In the preferred mode, aligned apertures are provided in the center of the leading edge of sheets of the preliminary sets except for the topmost sheet of each preliminary set which does not include such an aligned aperture. The suction tube for separating sheets from the trays will thus separate all of the sheets of an intermediate set for effecting the intended mode of operation.

Additional techniques may be utilized for advancing preliminary collated sets, one at a time, such as corner cuts or apertures in each sheet of a collated set except for the topmost sheet of each set. In addition, the topmost sheet of a collated set could extend beyond the remaining sheets of the set for being contacted and moved downwardly by the suction tubes. Such technique would require moving the suction tubes from the center of the sheet to the edges to grasp and advance the topmost sheet and sheets therebeneath with cut or apertured corners. A side finger as described above may then be used as opposed to the central types of fingers 64 to more firmly hold down the collated sets to be sequentially grasped and advanced.

Another technique includes the use of high speed feeders with photocells to sense a mark on the set at the point where separation is intended. In the alternative, an invisible fluorescent ink could be employed to sense the topmost sheet of a set. In these modes, a high speed feeder would advance the sheets of a single set to a staging area where they would be advanced together as a set to the sheet feeding station for movement and receiving of additional sheet material as required.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A method of collating sheets into sets from stacks of sheets wherein the number of sheets in each collated set may be greater than the number of stacks which can be supported within the collating machine comprising the steps of:

supporting a predetermined number of stacks of sorted sheets in a collating machine having a predetermined number of trays for supporting the stacks;

sequentially advancing sheets from the trays to mechanisms for sheet transport while transporting the advanced sheets to thereby collate the sheets into preliminary sets;

sequentially transporting the preliminary collated sets to a terminal point;

receiving and storing a plurality of preliminary collated sets in a hopper for set storage adjacent the terminal point;

moving the preliminary collated sets from the hopper for set storage to one of the trays;

supporting the preliminary collated sets in its tray;

supporting a predetermined number of additional stacks of sorted sheets in others of the trays;

sequentially advancing preliminary collated sets from its tray to the mechanisms for sheet transport and sequentially advancing additional sheets from the others of the trays to the mechanisms for sheet transport while transporting the advanced preliminary collated sets and additional sheets whereby preliminary collated sets and additional sheets are collated into final collated sets; and transporting the final collated sets sequentially to the terminal point.

2. The method as set forth in claim 1 and further including the step of sequentially transporting envelopes first from a supply of empty envelopes, and then past the terminal point whereat each envelope is sequentially stuffed with a final collated set of sheets, and then to a hopper for receiving the stuffed envelopes.

3. The method as set forth in claim 1, wherein only a single sheet is advanced from each tray to the mechanisms for sheet transport when the trays are supporting only sorted sheets.

4. The method as set forth in claim 1, wherein a predetermined plurality of sheets constituting a preliminary collated set is advanced from a tray to the mechanisms for sheet transport when a tray is supporting preliminary sets of collated sheets.

5. The method as set forth in claim 1 and further including the step of sensing the plurality of sheets constituting a preliminary collated set of sheets in the tray to preclude the advancing of more than a single set of preliminary collated sheets at one time.

6. The method as set forth in claim 2 and further including the steps of removing at least a portion of the mechanisms for envelope handling and adding the mechanisms for set handling when the trays contain only sorted sheets.

7. The method as set forth in claim 6 and further including the steps of adding at least a portion of the mechanisms for envelope handling and removing the mechanisms for set handling when a tray contains sets of preliminary collated sheets.

8. A system for collating sheets into sets from stacks of sheets wherein the number of sheets in each collated set may be greater than the number of stacks which can be supported within the system comprising:

a machine for supporting a predetermined number of stacks of sheets and for collating the sheets into sets, the machine including a sheet supporting station having a predetermined number of trays for supporting stacks equal in number to the predetermined number, the machine also including a sheet feeding station having sheet transport means located to sequentially receive and transport sheets sequentially advanced from the trays to thereby collate the sheets into sets and then to sequentially transport sets of collated sheets to the terminal end of the sheet transport means:

an envelope handling assembly including envelope transport means adapted to sequentially transport envelopes first from a supply of empty envelopes, and then to the terminal end of the sheet transport means whereat each envelope is stuffed with a set of collated sheets, and then to a hopper for receiving the stuffed envelopes;

a set handling assembly including intermediate set storage means adapted to sequentially receive and store a plurality of collated sets, the set handling assembly also including set feeding means adapted to sequentially receive sets of collated sheets from the terminal end of the sheet transport means and to feed the received sets of collated sheets to the set storage means; and positioning means on the machine adapted to removably position the set handling assembly with respect to the terminal end of the sheet transport means to the preclusion of the envelope handling assembly.

9. The system as set forth in claim 8, wherein the machine further includes means to advance a single sheet from each tray to the sheet transport means when the set handling assembly is operatively positioned with respect to the terminal end of the sheet transport means.

10. The system as set forth in claim 9, wherein the machine further includes additional means to contact, effectively sense, separate and advance a predetermined number of sheets constituting a collated set from at least one tray to the sheet transport means when the envelope handling assembly is operatively positioned with respect to the terminal end of the sheet transport means.

11. The system as set forth in claim 10, wherein the additional means includes means associated with the sheets of the tray supporting collated sets of sheets to contact, effectively sense and separate the predetermined number of sheets of a collated set to be advanced, and means to grasp and advance the predetermined number of sheets together as a collated set from the tray supporting the collated sets of sheets to the sheet transport means.

12. The system as set forth in claim 11, wherein the means to sense and separate is a suction tube adapted to contact the bottommost sheet in the stack of collated sets to be advanced from the tray supporting the collated sets of sheets, and further including means to move the suction tube downwardly to separate the bottommost collated set from the remainder of the collated sets in the tray, and further including means to eliminate the suction of the suction tube when the means to grasp and advance has grasped the separated bottommost collated set.

13. The system as set forth in claim 12, wherein the means to sense and separate includes aligned apertures in all of the sheets of each collated set to be grasped and advanced except for the topmost sheet of each collated set whereby the suctio from the suction tube will sequentially sense and separate one complete collated set of sheets including the apertured sheets and the non-apertured sheet immediately thereabove.

14. The system as set forth in claim 8 and further including means associated with the envelope handling assembly for releasably, operatively positioning at least a portion thereof with respect to the terminal end of the sheet transport means when the set handling assembly is not operatively positioned with respect to the terminal end of the sheet transport means.

15. A machine for collating sheets into sets from stacks of sheets comprising:

apparatus for supporting stacks of sheets and for collating the stacked sheets into sets, the apparatus including a sheet supporting station having trays for supporting stacks to be collated, the apparatus also including a sheet feeding station having sheet transport means located to sequentially receive and transport sheets advanced from the trays to thereby collate the advanced sheets into sets and then to sequentially transport sets of collated sheets to the terminal end of the sheet transport means;

set handling means including set storage means adapted to sequentially receive and store a plurality of collated sets, the set handling means also including set feeding means positioned higher than the terminal end of the sheet transport means and adapted to sequentially receive sets of collated sheets from adjacent the terminal end of the sheet transport means and to feed the received sets of collated sheets to the set storage means; and transition means positioned between the terminal end of the sheet transport means and the set handling means to support and upwardly guide sets of collated sheets from adjacent the terminal end of the sheet transport means into the set feeding means.

16. The machine as set forth in claim 15 wherein said transition means is a plate with an arcuate profile.

17. The machine as set forth in claim 16 and further including means to resiliently urge the plate upwardly into contact with the terminal end of the sheet transport means.

18. The machine as set forth in claim 15, wherein said transition means includes in input end releasably attached to the sheet transport means adjacent the terminal end.

19. The machine as set forth in claim 17 wherein said transition means includes an output end supported by the set handling means.

20. The machine as set forth in claim 19 wherein said transition means is adjustably attached to the sheet transport means adjacent the terminal end to accommodate the set handling means being positioned at different distances from the terminal end.

21. The machine as set forth in claim 19 wherein said transition means includes a plurality of trays of varying lengths, any one of which may be attached to the sheet transport means adjacent the terminal end to accommodate the set handling means being positioned at different distances from the terminal end.

22. A machine for collating sheets into sets from stacks of sheets comprising:

apparatus for supporting stacks of sheets and for collating the stacked sheets into sets, the apparatus including a sheet supporting station having trays for supporting stacks of sheets to be collated, the apparatus also including a sheet feeding station having sheet transport means located to sequentially receive and transport sheets advanced from the trays to thereby collate the advanced sheets into sets and then to sequentially transport sets of collated sheets to the terminal end of the sheet transport means;

set handling means including set storage means adapted to sequentially receive and store a plurality of collated sets, the set handling means also including set feeding means adapted to sequentially receive sets of collated sheets from adjacent the terminal end of the sheet transport means and to feed the received sets of collated sheets to the set storage means; and transition means positioned between the terminal end of the sheet transport means and the set handling means to support and guide sets of collated sheets from adjacent the terminal end of the sheet transport means into the set feeding means, said transition means having a plate with an arcuate profile.

23. The machine as set forth in claim 22 and further including means to resiliently urge the plate upwardly into contact with the terminal end of the sheet transport means.

24. The machine as set forth in claim 22 wherein said plate includes an input end releasaby attached to the sheet transport means adjacent the terminal end.

25. The machine as set forth in claim 23 wherein said transition means includes an output end supported by the set handling means.

26. The machine as set forth in claim 25 wherein said transition means is adjustably attached to the sheet transport means adjacent the terminal end to accommodate the set handling means being positioned at different distances from the terminal end.

27. The machine as set forth in claim 25 wherein said transition means includes a plurality of trays of varying lengths any one of which may be attached to the sheet transport means adjacent the terminal end to accommodate the set handling means being positioned at different distances from the terminal end.

28. Apparatus for sequentially feeding and storing sets of sheets comprising, in combination:

a sheet storage hopper adapted to receive and store a plurality of sets of sheets; and sheet feeding means having an input end adapted to sequentially receive sets of sheets to be fed and stored and an output end adapted to sequentially dispense sets of fed sheets to the sheet storage hopper and sheet feeding mechanisms to sequentially transport sets of sheets along a sheet feed path from the input end to the output end and into the storage hopper, said sheet feeding mechanisms including an upper elastomeric band and a plurality of lower elastomeric bands, each band being supported in a closed-loop configuration, with the upper band above, and the lower bands below, the sheet feed path, and with the lower extent of the upper band and the upper extents of the lower bands defining the sheet feed path therebetween, the upper band and lower central band being in mutual vertical alignment to contact one another when no sheets are present therebetween but to contact and transport sets of sheets which may be introduced to the sheet feed path at the input end, the bands being supported adjacent the input end and the output end by rollers, and further including motor means adjacent the output end to drive the rollers supporting the lower bands, the rollers and bands below the sheet feed path being fixedly positioned to define an incline extending upwardly toward the output end while the rollers and band above the sheet feed path are pivotable adjacent the output end to rest in sheet driving relationship with respect to the bands below the sheet feed path;

an inverted U-shaped support with roller-supporting shafts mounted, one above the other, at their ends in the vertical extents of the support; and arm extending from shafts adjacent the output end for supporting additional shafts, with the additional shafts supporting the rollers and bands adjacent the input end.

29. The apparatus as set forth in claim 28 and further including counter means operatively associated with the sheet feed mechanisms to count the number of sets of sheets forwarded by the sheet feeding means.

* * * * *